United States Patent
Gabel

(10) Patent No.: US 9,417,433 B2
(45) Date of Patent: Aug. 16, 2016

(54) CAMERA ARRANGEMENT

(71) Applicant: MOBOTIX AG, Winnweiler (DE)

(72) Inventor: Oliver Gabel, Reichenbach-Steegen (DE)

(73) Assignee: MOBOTIX AG, Winnweiler (DE)

( * ) Notice: Subject to any disclaimer, the term of this patent is extended or adjusted under 35 U.S.C. 154(b) by 5 days.

(21) Appl. No.: 14/628,960

(22) Filed: Feb. 23, 2015

(65) Prior Publication Data

US 2015/0249806 A1    Sep. 3, 2015

(30) Foreign Application Priority Data

Feb. 24, 2014    (DE) .......................... 10 2014 002 599

(51) Int. Cl.
*H04N 7/14* (2006.01)
*G02B 13/00* (2006.01)
*H04N 5/232* (2006.01)

(52) U.S. Cl.
CPC ........ *G02B 13/0045* (2013.01); *H04N 5/23219* (2013.01); *H04N 5/23296* (2013.01); *H04N 7/142* (2013.01)

(58) Field of Classification Search
CPC ...................................................... H04N 7/14
USPC ................... 348/14.01, 14.08, 14.02, 208.16
See application file for complete search history.

(56) References Cited

U.S. PATENT DOCUMENTS

| | | |
|---|---|---|
| 5,764,291 A | 6/1998 | Fullam |
| 2005/0212911 A1 | 9/2005 | Marvit et al. |
| 2006/0050982 A1 | 3/2006 | Grosvenor |
| 2009/0086042 A1* | 4/2009 | Vartiainen ............. G06F 1/1626 348/211.4 |
| 2011/0117960 A1 | 5/2011 | Miura |
| 2014/0028830 A1 | 1/2014 | Kieffer et al. |
| 2014/0028897 A1* | 1/2014 | Azuma .................. G03B 13/36 348/357 |
| 2014/0111600 A1* | 4/2014 | Schaefer ................ H04N 5/232 348/14.08 |
| 2015/0022674 A1* | 1/2015 | Blair ................... H04N 5/23222 348/207.1 |
| 2015/0304543 A1* | 10/2015 | Leon ...................... G03B 17/04 348/333.01 |
| 2016/0021316 A1* | 1/2016 | Tsubusaki .......... H04N 5/23245 348/240.1 |

* cited by examiner

*Primary Examiner* — Olisa Anwah
(74) *Attorney, Agent, or Firm* — Kagan Binder, PLLC

(57) ABSTRACT

The present invention relates to a camera arrangement comprising a sensor means for generating sensor signals indicating the camera orientation and a selecting means for selecting a setting out of a plurality of settings in response to the camera-indicative sensor signals. The camera arrangement has a plurality of zoom settings and the selecting means is configured for selecting a zoom factor in response to the camera orientation detected by means of the sensor.

15 Claims, 2 Drawing Sheets

CAMERA ARRANGEMENT

Figure 1:
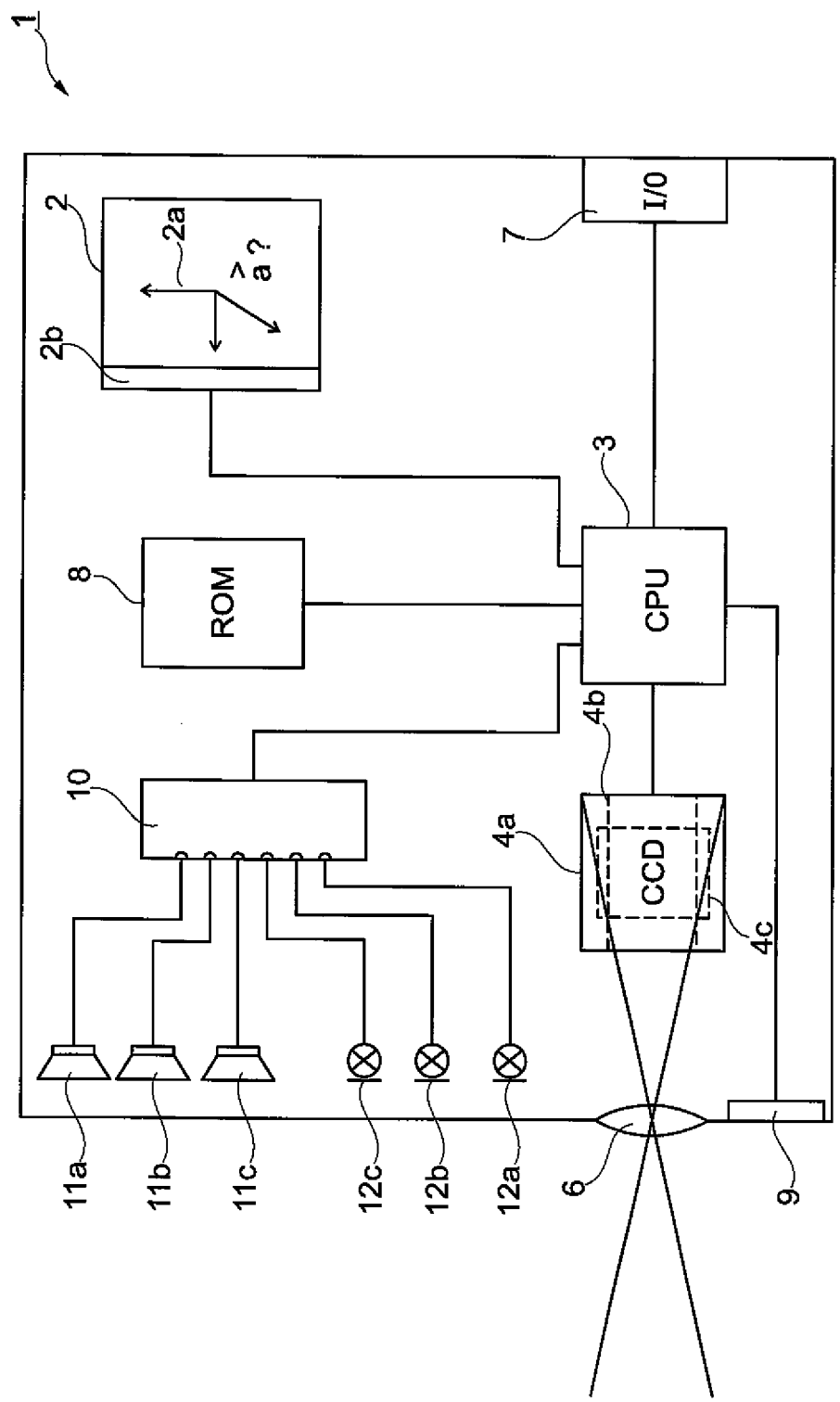

The present invention relates to the subject-matter claimed in the preamble and, therefore, it relates to a camera arrangement.

There are numerous known camera arrangements. The known camera arrangements are used for different purposes, for example for monitoring living spaces or as a communication camera which can generate images or pictures and audio signals for the communication with persons being in a different place. It is possible that one single person wants to communicate with other remote persons via the camera or it is also possible that several persons are simultaneously present at one side. This can be the case, e.g., in a video conference.

It is clear that the various applications of camera arrangements involve different camera requirements. For example, monitoring is typically carried out such that large areas of the room are covered, and for example that it is possible for a security firm or the like being remote from the camera to zoom in details and, moreover, only a small image repetition frequency is necessary, in particular in case the image of the monitored scene does not change considerably such as in empty rooms.

However, in video conferences it makes sense to carry out a regular, comparatively quick image update and to be able to transmit an image detail which shows all conference participants with the best resolution possible. However, if an individual uses the camera arrangement, it is typically desired that only a portrait detail of him/her with only little additional background is transmitted.

It would be possible to provide a dedicated camera arrangement for each intended use. However, if only for financial reasons, it is typically preferred to provide only one single camera arrangement and use it for several purposes. This applies, e.g., in the field of private users where with one and the same camera an apartment or a living space should be monitored, several family members who take part in a video conference with other persons should be recorded, or, if applicable, one single user uses the camera alone for communication purposes. This also applies to Office applications.

In such a case it makes sense if the camera is set or adjusted to the respective, specific intended use. It is particularly preferable if the camera can also be used by inexperienced users. Thus, it makes sense if specific settings are made automatically.

Cameras in which specific settings are made automatically are known. For example, it is known to provide a camera, for example a digital camera, with a sensor which is suitable for detecting a horizontal or vertical camera alignment, i.e. an orientation for the landscape or portrait format, and then store, on the one hand, the respective orientation signal together with a recorded image and, on the other hand, display previously recorded images in accordance with the camera orientation detected by means of the sensor.

US 2006/0050982 A1 describes a camera which is moved relative to a playing field during sports events such as football games. If the camera is moved very quickly, it is apparently difficult to keep the players in the image so that a relatively wide-angled zoom setting is used in case of quick movements.

U.S. Pat. No. 5,764,291 relates to a camera by means of which a user records different images such as landscapes or portraits. It is desired that exposure and focus are optimized independent of a current camera orientation; for this purpose, i.e. an orientation sensor is provided and its output is used for determining an optimum exposure.

US 2011/0117960 A1 discloses a mobile phone in which the zoom setting of an image to be captured is changed. The zoom control unit changes the zoom setting of a captured image on the basis of a detection of the displacement of the mobile phone housing.

US 2005/0212911 A1 shows a mobile device such as a camera. An orientation-dependent adjustment of an audio repetition function is suggested for communication purposes.

US 2014/0028830 A1 deals with the question as to how environmental conditions can be detected in a hazardous environment, for example in fire areas or in case of bombardment. For example, a plurality of cameras are arranged in a sensor housing and the sensor housing is dropped from an airplane at the observation site, or rolled into an area, etc. Moreover, exposure times, amplification, etc. of the camera are controlled.

It would be desirable to be able to provide a camera arrangement which can be handled easily also by inexperienced users and which is nevertheless well suited for a plurality of intended uses.

It is the problem of the present invention to provide new subject-matter for industrial applications.

The solution to this problem is claimed in independent form. Preferred embodiments can be found in the dependent claims.

In accordance with a basic idea of the invention, in a camera arrangement comprising a sensor means for generating sensor signals indicating the camera orientation and a selecting means for selecting a setting from a plurality of settings in response to the sensor signals indicating the camera orientation it is intended that the camera arrangement has a plurality of zoom settings and the selecting means is configured for selecting a zoom factor in response to the camera orientation detected by means of the sensor, in particular on a camera housing surface and/or the axis of the camera lens.

Hence, it has been found that the recognition of the camera orientation—when indicated and as preferred: recognition in a roughly evaluating manner only—is sufficient for predicting a setting necessary for the use typically desired by a user, in particular with respect to the zoom. Preferably, this respective selection of an orientation-dependent zoom setting can be realized by the orientation-dependent use of different programs that use the camera and are also used in a manner dependent on the orientation. In this connection advantage is taken of the fact that camera arrangements intended for communication and/or monitoring purposes should be used consistently in the same manner in typically few, but then regularly recurring situations. By the zoom selection suggested in accordance with the invention, an optimum image generation is guaranteed for each of these situations without the handling being complicated. This is relevant because users often consider the image generation to be particularly critical in a camera, in contrast to, e.g., the settings which influence the recording of audio data, because by speaking in a relatively loud or low voice a user can much more easily guarantee an audio quality that is still sufficient for communication and/or monitoring purposes irrespective of suboptimum settings.

Although the term camera orientation is often used in the present case, a reference to the camera axis or the lens axis is, as a rule, more exact in technical terms. Nevertheless, the term "camera orientation" is used almost permanently in order to stress that the user in the end manipulates a housing in which the camera is typically installed in a stationary, i.e. non-swiveling manner—hence, not the orientation of the lens axis is important to the user but the orientation of the camera housing. It is generally preferred to use a camera arrangement with a lens that is stationary relative to the camera housing.

In a preferred embodiment, the camera arrangement of the present invention is provided with a housing having a plurality of housing surfaces which can be used alternatively as standing surfaces for changing the camera orientation, and it is preferably provided with a cubical housing which can be placed on a plurality of its surfaces. In particularly preferred embodiments, a camera is used which can be placed on at least three of its standing surfaces provided on the housing and which selects a corresponding different zoom setting—and preferably also a corresponding application program—in accordance with its respective orientation. It is pointed out in this connection that the standing surfaces do not have to be flat in the geometrical-Euclidean sense. For example, three or more standing surfaces can also be realized in that three or more areas are defined in a ball-shaped housing which can be distinguished by the user, if applicable, by corresponding marks, surface structures etc., and then the ball is either structured internally such that it can be stably positioned in positions in which a respective area is facing downwards, or, e.g., the ball is supplied together with a support which has, e.g., a spherical recess for the camera and, moreover, offers a sufficiently high friction against undesired rotation of the housing in the recess.

By using housing surfaces as standing surfaces and since it is only necessary, to determine by means of the sensor on which of the alternatively usable standing surfaces the camera housing is presently standing, at first only a rough detection of the camera orientation is sufficient. Moreover, it can be guaranteed that solely by selecting a specific standing surface, a specific functionality of the camera arrangement is prepared. It is pointed out that when using housing surfaces that can be used as standing surfaces, a rough division of the sensor signals will be sufficient for determining a zoom factor and typically only few different zoom factors are necessary. Therefore, the system becomes more error-tolerant and thus can be handled better. The orientation sensor can be low priced because it does not have to have a high resolution.

By means of a sensor which generates signals indicating the camera orientation it can be detected, e.g., whether the camera lens is roughly generally directed upwardly, roughly directed downwardly or directed approximately along a horizontal line. Dependent thereon, the zoom factor can then be determined. A camera which is directed "roughly upwardly" can be used for the purposes of the present invention if, e.g., the optical axis of the lens is inclined not more than 30° of a 360° full circle relative to the vertical. A larger accepted inclination is not necessary as a rule because most users will direct the camera much more exactly upwardly if, e.g., video conferences are to be held. Here, alignment accuracies of typically equal to or better±15°, as a rule even±10°, are to be expected and it is therefore sufficient, if applicable, if this range is accepted instead of the broader, above-mentioned range of 30°, without the user having to make particular efforts for the setting. The deviations of the optical axis of the camera from the vertical will be larger or smaller depending on the design of the housing. For example, if a rigid, cubical housing is used, the inaccuracies are only due to an inclined base caused by, e.g., blankets lying on a table and developing folds, etc. When using ball-shaped housings which are placed on a housing surface area in a spherical recess, a slightly larger deviation must be expected which, however, will at the most rarely exceed the mentioned 15° or preferably 10°.

Hence, a camera lens which is (roughly) directed upwardly is indicating the fact that the camera arrangement should presently be used either for a video conference or possibly also for monitoring a room on the floor of which the camera has been placed. In both cases a very wide-angle image detection will be preferred, typically a hemispherical image detection. It is also pointed out that, if applicable, for a video conference a different image processing is possible, for example, in that relatively large distances between conference participants are not transmitted in an image data stream or only with low resolution and/or the room areas clearly above the heads of the conference participants are trimmed. It is explicitly pointed out that this preferred variant can be selected automatically by the camera and thus without interaction of the communication participant. In this connection, exposure measurement can be related to only those areas which should actually be transmitted, so that it is not disturbing in view of the image quality or the overfill image brightness if the camera is directed per se to a ceiling light. It is pointed out that in a video conference mode the selected exposure of an image can be determined automatically (by automatically setting a specific ISO value, changing the aperture and/or predetermining an exposure duration per frame of a video stream), for example by reference to those details in which faces have been recognized automatically. Then, all details can be averaged. Preferably, the average value is selected such that none of the faces is overexposed. If necessary, the brightness of the remaining faces can be increased such that all faces are shown in approximately the same brightness. Where it is not possible to guarantee a high image quality for all faces because the exposure conditions vary too much, use can be made of the fact that conference participants as a rule do not move very much, i.e. a low refresh rate is sufficient for each individual face. Hence, if necessary, it is possible to select a particularly suitable exposure for specific conference participants in a dedicated manner, said exposure being, e.g., particularly bright or dark, and then a corresponding update can be made for this participant in a video stream which is composed of a plurality of partial images each showing the respective face of one of the conference participants. Moreover, if necessary, it is possible to select a Round-Robin method for optimizing the exposure for each participant and, moreover, to group the participants in groups having virtually the same exposure requirements, and to make a prioritization, e.g., in accordance with the activity such as movement or participation in a conversation. Furthermore, it is typically preferred to equalize the color temperature and brightness of the individual images if images of all participants in the conversation are included in a common video stream. Where the exposure conditions vary in large rooms, the color temperature of all individual images is typically also equalized to better than 50K, preferably better than 20K, if—as is preferred—color images are transmitted. The equalization of the brightness of the individual images can adapt the median of luminescent diagrams, wherein, however, it is particularly preferred that, in case structureless large-surface backgrounds are detected behind the face, the brightness adaptation of the luminescent diagrams or the color adaptation is made in view of these backgrounds.

Moreover, in addition to faces, also specific areas such as blackboards, etc. can be defined for being simultaneously transmitted. This can be done automatically by means of markers on the blackboard or the like, which can be identified by image recognition, or by user default on one of the two communication sides.

Furthermore, it is easily possible to automatically define an area above the heads in which the image should be trimmed. In this connection it is, on the one hand, possible to take advantage of the fact that in case of a typical camera orientation on a table and facing upwardly, the corresponding image areas close to the ceiling are lying centrally on a sensor, and by means of image analysis methods it can be determined how close to the camera the participants are sitting and/or how high the faces are arranged above the table.

Thus, all in all, the bandwidth required for the transmission of significant images which are pleasing to the eye is reduced although the handling is very simple.

It is pointed out that, if applicable, the use of the camera for a video conference can be distinguished from the use of the camera for monitoring a room although in both cases an axis of the camera lens is directed upwardly, e.g., in case it is determined by means of image detecting methods whether a plurality of faces of comparatively non-moving persons can be seen in the image. This is in favor of a video conference. If the camera is arranged centrally on a round table, it can be assumed that the faces in the field of view have almost the same size. If the camera is arranged decentrally and/or if the table is not circular, the sizes of the faces will typically vary along the circumference of the table but—if it is assumed that the faces of all participants in the video conference have the same size—in a systematical manner. Since faces can be identified well by image recognition, such an arrangement can be identified by image recognition and can be used alternatively, preferably, however, additionally for selecting a video conference setting. Moreover, it is possible to identify differences in the sizes of the faces and to then compensate for them so that, preferably, all participants are shown in approximately the same size in a combined video stream. The above shows that in a preferred embodiment an image analysis step is provided which is able to recognize images, detect faces in the image, as well as preferably also detect face sizes and/or preferably also detect face positions and preferably also detect the change in face positions during a predetermined time period, wherein the output of the image analysis step is preferably used for reacting to a plurality of faces recognized in the image, in particular, if required, also by selecting a video conference mode and/or by compensating for non-equal face sizes in an image with a video stream being composed of faces being shown in a more or less isolated manner and/or for adapting selected image details in response to detected movements of faces.

It is pointed out that a detection of the desired image evaluation can alternatively be based, e.g., on the evaluation of gestures from the very beginning. However, for the evaluation of gestures it is, if applicable, required that the user knows specific gestures, which can in this regard be an obstacle to an intuitive use. This very example already shows that in addition to the zoom preferably additional specific camera programs are also influenced in accordance with the camera orientation. In the following it will be understood that these camera programs influence preferably one or particularly preferably more of the following values: transmitted image repetition rate and image resolution of sent images, image reproduction means for received images or image streams, and image repetition of received images or image streams, image resolution, provision of a plurality of partial images in a sent image stream, influencing the audio data recording and processing, in particular in directional view of filtering and/or amplification and/or directional sensitivity. These values are influenced if, in at least one camera program selected, depending on the camera orientation, a value is different from that of a camera program which is selected in case of a different camera orientation.

Hence, it is per se possible to base the selection of a camera setting not only on the spatial orientation but to evaluate a plurality of parameters and thus additionally further data. In particular, provided that the computing power is sufficient, image processing methods can be used for identifying a respective camera utilization and then making use of different applications.

It is preferred if the camera lens is trained through one of the housing surfaces that can be used alternatively as standing surfaces and the selecting means is configured for deactivating at least the camera if the sensor means has detected that the camera arrangement was placed on this housing surface.

It is in turn pointed out that the downward orientation of the camera lens does not automatically mean that the camera has been put down and should be deactivated. Rather, it would also be possible that the camera is directed downwardly from the top towards a room to be monitored. If it should be guaranteed in this regard that, if necessary, also a room can be monitored from the top by means of the camera, e.g., additionally also the brightness might be detected by the downwardly oriented camera lens. If the detected image is very dark, i.e. during a relatively long time period, this is in favor of the fact that the camera arrangement was placed on the housing surface through which the camera lens captures images. In this case the camera arrangement should be deactivated.

Otherwise, i.e. if, irrespective of the downward orientation of the camera lens, a sufficiently bright image is still recorded, this is in favor of the fact that the camera is directed downwardly for monitoring the room or the like. In this case, a wide-angle zoom setting should thus be selected automatically, as well as, if necessary a transmission setting suitable for transmission purposes, e.g. with relatively high-resolution images and low frame rate. Moreover, also the aspect ratio of a transmitted image can be determined depending on the zoom factor and/or the detected use.

It is pointed out that there is the risk that the user wants to deactivate the camera but places the camera onto a glass table or any other transparent base for deactivating it, which might cause the camera to continue its operation in the preferred embodiment. This is unfavorable because, on the one hand, the energy consumption is higher than in the standby mode or in the deactivated state, i.e. the lifetime of the battery is reduced, and, on the other hand, possibly no interesting images but speech from secret conversations is transmitted. Therefore, if applicable, it can be preferred to display always the present operating or zoom mode on the camera housing, in particular on a plurality of housing sides.

Moreover, there are different possibilities of activating the camera. For example, since cameras are built sufficiently stably for communication purposes, the camera can be reactivated, e.g., by shaking it and/or by testing regularly whether or not the camera orientation has changed.

For regularly testing whether there are changes in the camera orientation or not, it will be sufficient that, e.g., every half second to two seconds a test is made, without the user of the camera considering the respective delay time possibly needed before activating the camera as being inappropriate. If the camera is deactivated when being placed accordingly, a considerable amount of energy is saved even if the orientation is newly tested on a regular basis, because only few selected circuits must be active, moreover rarely active, i.e. a possibly present battery or accumulator can guarantee accordingly long operating times.

It is preferred if the selecting means is configured for generating relatively wide-angled images, in particular hemispherical and/or panorama images, in case the housing surface comprising the camera lens is oriented upwardly. In this connection it is pointed out that even in cases in which a camera arrangement for video conferences should be placed on a table, a hemispheric image recording is advantageous but not imperative. It is pointed out that, if applicable, the lens can be retractable into the surface, e.g., if it is intended to place the camera on this surface for deactivating it.

It does not cause any problems if the camera lens is so wide-angled that the images are distorted, e.g., distorted in a fish-eye manner. In this case the images can easily be rectified by means of algorithms known per se. This is particularly applicable if the camera is used for monitoring purposes. In this case, individual details can be rectified or a depiction can be selected in which at least the most important areas of the room are shown with at the most a slight distortion. If applicable, it is even possible that a user can predetermine the preferred rectification in the wide-angle image. In particular, it is possible that the user who determines the desired image details is remote from the camera.

Therefore, it is not necessary that the communication participant makes the settings himself/herself in front of the camera or at the camera. For example, this is advantageous if the camera should be used in rough areas such as in construction sites or industrial plants. In this case it might be sufficient that the camera is placed somewhere in such a manner that it guarantees a wide-angle image detection because of its orientation and provides a relevant image detail for monitoring purposes. At the same time, a field worker can talk to a control center by taking this camera and changing its orientation. Thus, it becomes possible to contact experts from a control center in a particularly simple manner for specific tasks, e.g., for maintenance work on complicated machines.

It is preferred if the selecting means is configured for selecting a relatively narrow image angle if the normal relative to the housing surface comprising the camera lens is oriented generally horizontally.

If the camera axis extends generally horizontally, i.e. if the normal relative to the housing surface comprising the camera lens is oriented generally horizontally, the camera will be used such that an individual participant can use the camera for a video telephone talk, or the camera is directed to a particularly important detail.

If the normal relative to the housing surface comprising the camera lens is orientated generally horizontally, often a relatively narrow image angle which is suitable for portrait images and the like should be selected. "Generally horizontally" can mean here a deviation from the horizontal of, e.g., ±20° (of a 360° full circle). Thus, the camera can still be directed easily upwardly or downwardly so as to face the user while standing on a table or shelf or can be held in the hand and directed, e.g., to an interesting machine detail. If also a deviation of more than 20° should be accepted, it is preferred if the respective housing surface is configured in a correspondingly anti-slip manner. Thus, it must be guaranteed that the housing does not slide down on the typically provided bases in the orientations which are considered and classified as still being generally horizontal. To this end, the respective housing side can be provided with a respective coating or the like. Moreover, it is obvious that the center of gravity of the camera will typically be so low that, in the orientation recognized as being generally horizontal, the arrangement does not tilt or there is no risk of tilting if the camera is slightly inclined further relative to the position in which it was placed.

However, if the selecting means is accordingly configured, it is preferred to select, depending on the orientation, different applications for a plurality of generally horizontal orientations of the normal relative to the housing surface comprising the camera lens.

Typically, a user will orientate the camera in an approximately horizontal manner not only for recording portraits and details but also if, e.g., he/she wants to monitor a room in a simple manner for a short time period or temporarily. While for a continuous monitoring the arrangement of a monitoring camera at the ceiling is undoubtedly advantageous, for a temporary monitoring the camera can be arranged in a slightly raised manner in a shelf without having to be mounted therein. The camera is then typically slightly inclined downwardly if it is possible to position it close to the top in the preferred manner. This is an orientation which can also be advantageous for the communication of a single person with a remote station. In order to then decide whether the camera should be used for transmitting portrait-like images or for monitoring rooms thereby using a clearly wider angle of view, it is possible so select one out of a plurality of housing surfaces in which the camera axis per se has the same inclination or orientation. This is particularly easy if a cubical housing or a prism-shaped housing is used.

It is preferred if the camera arrangement of the invention comprises a microphone arrangement for which at least the reference characteristics and/or the sensitivity can be set in an orientation-dependent manner. Preferably, it can be a microphone array.

The use of a microphone array or another microphone with selectable reference characteristics is advantageous to allow an adaptation of the audio recordings in accordance with the zoom factor and thus guarantee an optimum detection of noise, speech, etc. without background noise having a too strong negative effect. It is obvious that for monitoring a room, if applicable, also low noise from possibly all directions should be detected while, e.g., for video conferences only comparatively loud conversations should be detected but not the rustling of documents, the squeaking of chairs, etc. Moreover, it is pointed out that alternatively and/or additionally it is also possible to provide a plurality of loudspeakers in the housing and to activate them differently depending on the intended use, i.e. to control different loudspeakers and/or to control loudspeakers with different volumes.

Moreover, it is clear that an individual person who wants to communicate with a remote station by means of the camera arrangement should typically be detected with a narrowly set characteristic for side noise suppression.

It is preferred if in a camera arrangement of the invention a monitor is provided on at least one surface and the selecting means is configured for reproducing images of a remote station, in particular in an orientation-dependent manner.

It is pointed out that the camera arrangement does not necessarily have to comprise a monitor or another display but that such monitor or display can already be sufficient in particular for the one-to-one communication of a single person with a remote station since it reproduces a small image. Also when using the camera arrangement for maintenance purposes or the like, at least a small display area can already be sufficient.

For video conferences and the like, however, it will typically be preferred if additionally at least one large monitor is present in the conference room for displaying images received from the remote station.

It is preferred if the camera arrangement of the invention comprises a prime lens and the selecting means is configured for electronically determining the zoom factor.

It has already been mentioned that the lens is preferably provided in a fixed, i.e. stationary manner at the housing. If the lens is at the same time a prime lens and the zoom factor is determined only electronically, i.e. by selecting a corresponding sensor range, the structural arrangement can be considerably simplified and reduced in price. Irrespective of the required zoom factor, the total number of pixels of the camera sensor does not have to be exorbitantly high because for the one-to-one communication with a remote station, an image detection will typically be made close to the optical axis of the camera lens—which is preferably very wide-angled—so that the image quality is nevertheless high and moreover also a comparatively low resolution is still considered to be sufficient.

For monitoring rooms by means of an only temporarily used camera arrangement, however, it is typically only expected that it is possible to detect whether there are any movements, whether a helpless person is lying on the floor, or the like. For this purpose, however, relatively low resolutions are still sufficient.

Also for video conferences, when the camera is positioned on the tabletop of a non-oversized table, the resolution of even low-priced sensors will, as a rule, be still so high that the conference participants and their facial expressions can be seen in detail without any problems.

It is preferred if in a camera arrangement of the invention the sensor is configured as triaxial acceleration sensor.

In principle, it would be possible to use sensors different from a triaxial acceleration sensor for detecting the camera orientation. For example, the side surfaces of the housing can be made pressure-sensitive for detecting on which housing side the camera is presently placed and to thus conclude the camera orientation therefrom. The use of a triaxial acceleration sensor, however, is advantageous because also vibrations of the camera can be detected easily so that image stabilization becomes possible. Hence, the use of the camera arrangement in trains, on ships, etc. is improved considerably. Moreover, it is possible to easily detect slight temporary and permanent inclinations. This can be used for further improvements. For example, in case the camera is arranged in a tilted manner but the orientation per se is in favor of a specific intended use, an image can be aligned horizontally within this use. The sensor signal of the triaxial acceleration sensor is then at first classified roughly in order to determine a zoom factor, and then an image correction, in particular a horizontal alignment, is made within the selected zoom area. This is particularly preferred because the handling is further simplified by allowing high tolerances in the placement of the camera, and nevertheless a very good, namely horizontally-aligned image can be presented to the remote station. For example if the camera is used for a video telephone call of a single person, it is possible to allow inclinations in two directions so that the camera is directed, e.g., from the top downwardly to the communication participant but is not exactly level, i.e. detects the horizon in an inclined manner. In such a case the inclination from the top downwardly to the viewer can be accepted as desired by the automatic image processing, while tilting of the horizon is automatically compensated for by image processing.

If necessary, such a horizontal alignment can also take into consideration time-averaged sensor signals. Irrespective of vibrations, it is thus nevertheless possible to achieve an optimized image reproduction at the remote station.

It is preferred if the camera arrangement of the invention comprises a wireless connection for transmitting audio/video signals recorded by means of the camera to a host computer, preferably at least also for receiving audio/video signals from the host computer.

The wireless connection via WLAN, Bluetooth or other wireless standard interfaces is advantageous mainly in case the camera is driven by a battery or accumulator. In such a case it can be positioned completely freely.

It is possible that only audio/video signals are transmitted, e.g., to a monitor in a conference room and the camera itself communicates with a WLAN base station in order to set up the communication with the remote station via this WLAN base station. However, it is also possible that the camera communicates with a host computer which, on its part, supplies a monitor in a conference room with images from the remote station and sets up the communication. It will be appreciated that thus the camera's own connection to a WLAN, UMTS or other radio base station allows for an even more autarkic system which can be operated easier. In this connection it is in particular pointed out that the connection to a WLAN station has been mentioned only exemplarily and instead of course also a connection via UMTS is possible or other radio standards can be used with remote stations. It is obvious in this connection that the communication camera of the present invention is typically and preferably network-compatible. In particular, it can be a web camera which is responsive to interne standard protocols such as TCP/IP.

Therefore, it is clearly comprehensible that it is particularly preferable if not only two different camera orientations can be distinguished, on the basis of which a zoom setting and/or —preferably—a camera program is selected, but that at least three camera orientations can be distinguished and the orientation detected in a sensor-supported manner can lead to the use of one zoom setting and/or one camera program out of more than two possible ones. It is also pointed out that, if applicable, in specific cases, in response to a specific alignment, the user is only offered different zoom settings selected in an orientation-dependent manner from a large number and preferably camera programs for the selection by the user, but that preferably the zoom setting and/or the camera program is/are selected fully automatically.

Moreover, it is clearly comprehensible that it is possible to make an adjustment only when the camera has remained some time, e.g., 2 to 3 seconds with only slight movement in one and the same rough orientation. A movement can be considered to be slight if the camera is not moved more than the area defined above as being "rough" or, preferably, if the camera movement is only a fraction, e.g. a third of this rough value and/or if no high-frequency movements are determined, wherein those frequencies are considered to be high-frequency which indicate that the camera is carried along—thus, a definition is clearly possible for the person skilled in the art.

Protection is also sought for a method for operating a camera arrangement, in particular a camera arrangement as described above, wherein sensor signals indicating the camera orientation are generated and a zoom factor is determined in response to the generated sensor signals, and wherein preferably also an orientation-dependent processing of audio/video signals recorded by means of the camera is carried out, in particular a back-light suppression and/or an image rectification and/or an image trimming.

In the following, the invention will be described only exemplarily with reference to the Figures. In said Figures FIG. 1 shows a block diagram of a camera arrangement according to the invention, FIG. 2 shows a camera arrangement of the present invention in different positions.

Figure 2:
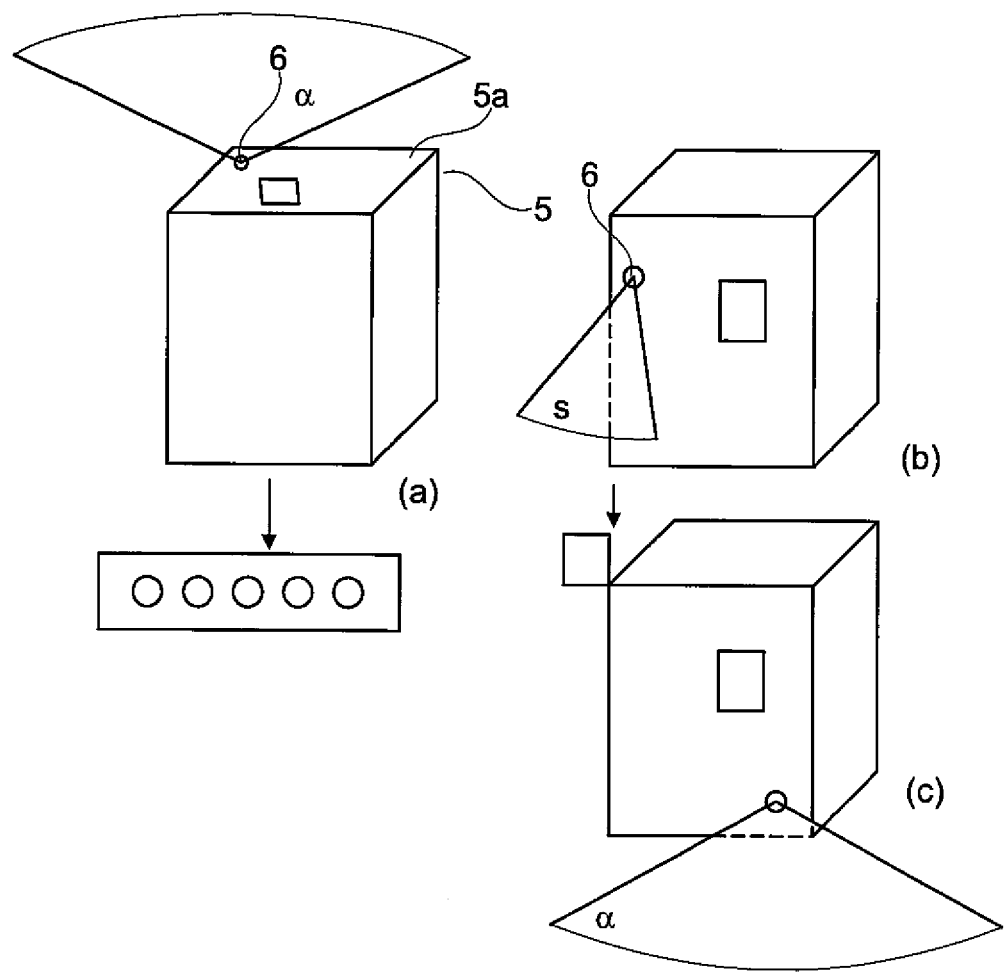

According to FIG. 1, a camera arrangement 1, which generally has the reference number 1, comprises a sensor means 2 for generating sensor signals indicating the camera orientation and a selecting means 3 for selecting a setting out of a plurality of settings in response to the sensor signals indicating the camera orientation, wherein the camera arrangement 1 has a plurality of zoom settings 4a, 4b, 4c and the selecting means 3 is configured for selecting a zoom factor in response to the camera orientation detected by means of the sensor 2.

In the present embodiment, the camera arrangement 1 is housed in a cubical housing 5 which can be placed on any one of its sides.

The camera lens 6 or a protective cover for it is arranged in a planar manner in a housing wall 5*a*. FIG. 2 shows the lens 6 close to a corner of the cube. This is not imperative but has only been selected in order for the orientation being better visible. In the present case, the camera arrangement 1 is provided as a battery-driven arrangement with an internal battery or internal accumulator (not shown) and communicates with a remote station via an interface 7 which, in the present case, is configured for wireless communication. In the shown embodiment, the interface 7 is realized as a conventional WLAN interface. The use of an autarkic camera housing without cable connections is not imperative but advantageous because the orientation of the camera on the camera's housing surfaces is easier and, moreover, the design is improved.

In the present embodiment, the camera arrangement is provided with a wide-angle lens 6 whose image is detected by means of a spatially sufficiently highly resolving CCD sensor 4. The processed image sensor data are submitted to a CPU 3 by means of which an image detail can be selected for determining the zoom factor by way of a digital zoom control. Depending on the selected image detail, only an area suitable for portraits, shown by dash-dotted lines 4*c*, an area trimmed at the edges, shown by dashed lines 4*b*, for video conferences, or a complete image 4*a* for room monitoring purposes or the like is selected.

The CPU 3 is connected to a memory 8 which is realized in the present case as ROM and in which the CPU instructions (previously referred to as "programs" or "camera programs") for the respective operating modes are stored. It is obvious that instead of a ROM 8 also other memories can be used.

For communicating with a remote station, the CPU 3 is further connected via a line to the I/O interface 7, as well as to a display 9, which is provided on the housing surface in which also the camera lens 6 is arranged.

The display 9 is configured as touch screen, i.e. as a touch-sensitive monitor.

The CPU 3 is further connected to an audio controller 10 which controls an array of loudspeakers 11*a* to 11*c* as well as an array of microphones 12*a* to 12*c* which, when being connected accordingly, can receive or irradiate sound in a more directed or more wide-angled manner.

The CPU 3 is further connected to the sensor means 2 which, in the present embodiment, is formed by a triaxial accelerometer 2*a* with corresponding signal conditioning 2*b*. The sensitivity of the sensor means 2 is sufficient for detecting the orientation of the sensor in the earth gravitation field. The triaxial sensor is firmly connected to the housing and, in this respect, also fixed relative to the camera lens because the later is firmly provided in the housing. By determining the orientation of the triaxial accelerometer it is thus possible to detect the orientation of the camera housing.

The invention is carried out as follows:

After a wake-up signal, which the camera arrangement receives via WLAN or by detecting a shaking movement, the orientation of the camera arrangement is determined by means of the triaxial accelerometer.

It is assumed that it is first determined that the lens opening points upwardly, as shown in FIG. 2*a*. This means that the camera should be used for the purpose of a video conference and, thus, should capture and transmit wide-angle images without, however, covering the central region towards the top where typically the ceiling is located.

Via the touch screen, first the address of a remote communication station for the video conference is input. However, it is pointed out that this can also be done in a different manner, if necessary, for example via a host computer or speech recognition.

In response to a program loaded from the ROM 8, a corresponding part of the data is selected from the image sensor 4 and then, after a per se known rectification of the image detected in a wide-angle manner, faces are recognized in the image data in a manner which is also known per se. The areas in which faces are continuously recognized during a predetermined time period are combined for the transmission with some space to the left, right, top and bottom as the places in which persons who are taking part in the conference are sitting, and a corresponding video data stream is transmitted together with an audio data stream to the interface 7 for being transmitted to a remote communication station. The frame rate can be selected to be small. If the bandwidth is restricted considerably, the image areas in which persons who are clearly moving are located can be updated more frequently, if required.

The audio data can be received by recording them in the room by means of the three microphones 12*a* to 12*c* and the audio controller 10, wherein the audio controller controls the microphones such that conference contributions are detected uniformly throughout the entire room. It is obvious that, if required, the following can be carried out: noise suppression of side noise, filtering to relevant speech bands, and advantageously an adaptation of the microphone direction sensitivity in accordance with the areas in which conference participants are sitting according to the image evaluation, etc.

Further, the remote station receives an audio-video stream. The video data are separated by the CPU3 and transmitted via the WLAN interface 7 to a host computer in the video conference room, to which a large display is connected, in order to provide images of the remote station for all participants in the video conference in the room in which the camera arrangement 1 is located. Moreover, it is of course possible to provide a plurality of monitors.

In the selected embodiment, the internal small display 9 in the camera arrangement is switched off during the video conference.

During the video conference, the signal from the sensor 2 is at the same time evaluated continuously. It is detected whether very great changes in the output signal occurred, which are indicative of an orientation of the camera, which in turn means that a video conference is over. Moreover, it is possible to detect whether slight vibrations occur which, e.g., indicate that a participant in the video conference has, e.g., bumped into the table on which the camera is placed. In such a case, an image stabilization that is known per se can be carried out in order to reduce shaking of the image from frame to frame and/or the shaking of individual frames.

If it is intended to terminate the video conference, one of the participants in the video conference takes the camera arrangement 1 and places it on the conference table with the lens facing down. Since thus the orientation of the triaxial accelerometer changes and the recorded camera image at the same time becomes dark, the camera notices that it should switch off. A corresponding program is loaded from the ROM 8, which only provides for a periodic checking whether there is a shaking wake-up movement of the camera or not but no further data processing or transmission.

If the camera is then waked-up and turned such that the camera lens faces to the front and moreover is located at the top in the front surface, a program is loaded from the ROM 8 by means of which a communication between an individual communication partner and a remote station becomes possible. For this purpose, an image angle beta is selected by evaluating a relatively small area 4c of the sensor surface 4, wherein beta is much smaller than alpha, i.e. the image angle for the video conference. The individual communication participant who uses the camera arrangement 1 can in turn input the desired remote station via the touch screen. A video connection is then established automatically via mechanisms that are known per se.

Since typically the connection is established to a dialog partner being an individual as well, the latter can be shown on the display 9 in a suitable resolution. Parallel thereto, however, a video stream is in turn transmitted to a host computer in order to allow there a large-area display. Under the control of the CPU 3, the audio controller 10 switches the loudspeakers 11a to 11c such in this application that sound is irradiated mainly to the front and the microphones 12a to 12c such that they receive sound mainly from the front and thus at the same time less intensively from the sides.

Again, parallel to the image processing and data transmission, the sensor data are detected from the sensor 2 indicating the camera orientation in order to detect whether the camera has been moved or tilted or turned.

If it is later intended to place the camera arrangement in a room for monitoring purposes, for example in order to control that unauthorized persons do not enter or search through a room, the camera is placed in a somewhat elevated position with the camera lens facing forward at the bottom of the front surface. This orientation is detected by the triaxial accelerometer 2 and then, in accordance with the sensor signal indicating the camera orientation, a program suitable for the monitoring is called from the ROM, wherein said program automatically establishes a connection to a remote station and provides the remote station with images which have been recorded in a wide-angle manner, can be rectified at the remote station in a manner known per se, and at first have a fixed low frame rate until the remote station requests a higher transmission rate and/or specific image details, which is intended in this mode.

Hence, it has been suggested above that it is intended in a camera arrangement comprising a sensor means for generating sensor signals indicating the camera orientation and a selecting means for selecting a setting out of a plurality of settings in response to sensor signals indicating the camera orientation that the camera arrangement comprises a plurality of zoom settings and the selecting means is configured for selecting a zoom factor in response to the camera orientation detected by means of the sensor.

Further, it has been suggested for such a camera arrangement that it can be made with a housing having a plurality of housing surfaces which can alternatively be used as standing surfaces for changing the camera orientation, preferably with a cubical housing which can be placed on a plurality of its surfaces.

Also disclosed is a camera arrangement in which it is additionally and/or alternatively provided that the camera lens is oriented by a housing surface which can alternatively be used as standing surface and that the selecting means is configured for deactivating at least the camera in response to the placement of the camera arrangement on this housing surface detected by means of the sensor means.

Also disclosed is a camera arrangement in which it is additionally and/or alternatively provided that the selecting means is configured to generate wide-angle images, in particular hemispherical and/or panorama images if the housing surface comprising the camera lens is orientated upwardly.

Also disclosed is a camera arrangement in which it is additionally and/or alternatively provided that the selecting means is configured for selecting a relatively narrow image angle if the normal relative to the housing surface comprising the camera lens is oriented generally horizontally.

Also disclosed is a camera arrangement in which it is additionally and/or alternatively provided that the selecting means is configured for selecting, depending on the orientation, different applications for a plurality of generally horizontal orientations of the normal relative to the housing surface comprising the camera lens.

Also disclosed is a camera arrangement in which it is additionally and/or alternatively provided that a microphone arrangement is provided thereon, in which the reference characteristics and/or the sensitivity can be set depending on the orientation.

Also disclosed is a camera arrangement in which it is additionally and/or alternatively provided that at least one of the surfaces comprises a monitor and the selecting means is configured for reproducing images of a remote station, in particular in an orientation-dependent manner.

Also disclosed is a camera arrangement in which it is additionally and/or alternatively provided that a prime lens is provided and the selecting means is configured for determining the zoom factor electronically.

Also disclosed is a camera arrangement in which it is additionally and/or alternatively provided that the sensor is arranged to be a triaxial acceleration sensor.

Also disclosed is a camera arrangement in which it is additionally and/or alternatively provided that a wireless connection is provided for transmitting audio/video signals recorded by means of the camera to a host computer, preferably at least also for receiving audio/video signals from the host computer.

Also disclosed is a method for operating a camera arrangement, in particular a camera arrangement as described above, wherein it is provided that sensor signals indicating the camera orientation are generated and a zoom factor is determined in response to the generated sensor signals, wherein preferably also an orientation-dependent processing of audio/video signals recorded by means of the camera is carried out, in particular a back-light suppression and/or an image rectification and/or an image trimming.

The invention claimed is:

1. A camera arrangement
   having a housing,
     which can be placed in a plurality of orientations,
   and a plurality of zoom settings,
comprising
   a camera lens in a housing surface,
   a sensor means
     for generating sensor signals indicating the camera orientation
   and
   a selecting means
     for selecting a setting
       out of a plurality of settings
     in response to the sensor signals indicating the camera orientation,
characterized in that
the camera arrangement is configured
   as communication camera arrangement for generating and transmitting audio and video data
     for the communication
       of a single person
       or
       a plurality of persons simultaneously with another party being in a different place,
wherein
the selecting means is configured
   for detecting, by means of the sensor means, in which orientation the housing was placed and,
in response to the camera orientation
   detected by means of the sensor means,
   for selecting a zoom factor such that
   in case the camera lens is generally oriented upwardly
   a setting is
     automatically
   selected by generating wide-angle panorama images with a first zoom factor in order to thus allow video conferences with a plurality of persons simultaneously using the camera
   and
   at least in one case the housing is oriented such that the camera lens is generally horizontal,
   a setting with a second zoom factor is selected which corresponds to a narrower image angle than the first zoom factor, in order to detect individual persons in front of the camera lens.

2. The camera arrangement according to claim 1, characterized in that the selecting means is configured for accepting an orientation of the camera lens with an alignment accuracy of ±10° of a 360° full circle as still being directed generally upwardly and/or for accepting deviations from the horizontal of ±20° of a 360° full circle as being a generally horizontal orientation.

3. The camera arrangement according to claim 1, characterized in that it comprises a prime lens and the selecting means is configured for determining the zoom factor electronically.

4. The camera arrangement according to claim 1, characterized in that it is configured for varying in addition to the zoom factor also the aspect ratio of transmitted images.

5. The camera arrangement according to claim 1, characterized in that the housing comprises a plurality of housing surfaces or housing areas which can be used alternatively as standing surfaces for changing the camera orientation.

6. The camera arrangement according to claim 5, characterized in that the camera lens is aligned by a housing surface which can alternatively be used as standing surface and the selecting means is configured for deactivating at least the camera in response to the placing of the camera arrangement on said housing surface detected by means of the sensor means.

7. The camera arrangement according to claim 1, characterized in that the selecting means is configured for selecting, depending on the orientation, different applications for a plurality of generally horizontal orientations of the normal relative to the housing surface comprising the camera lens.

8. The camera arrangement according to claim 1, characterized in that a microphone arrangement is provided thereon in which the directional characteristics and/or the sensitivity can be set depending on the orientation, wherein preferably the camera arrangement is configured such that for the communication of a single person with a remote station a narrowly set characteristic for noise suppression is selected.

9. The camera arrangement according to claim 1, characterized in that a monitor is provided in at least one surface and the selecting means is configured for reproducing images of a remote station in an orientation-dependent manner.

10. The camera arrangement according to claim 1, characterized in that the sensor means comprises a triaxial acceleration sensor.

11. A method for operating a camera arrangement according to claim 1, characterized in that it is detected by means of the sensor means in which orientation the housing was placed and in response to the camera orientation detected by means of the sensor means a zoom factor is selected such that in case the camera lens is oriented generally upwardly, a setting is automatically selected by means of which wide-angle panorama images with a first zoom factor are generated in order to thus allow video conferences with a plurality of persons being arranged simultaneously around the camera and, at least for an orientation of the housing such that the camera lens is generally horizontal, a setting is selected which comprises a second zoom factor which detects a narrower image angle than the first zoom factor in order to detect images of a single person in front of the camera lens.

12. The method according to claim 11, characterized in that in addition to the orientation of the camera also vibrations of the camera are detected and an image stabilization is carried out.

13. The method according to claim 1, characterized in that the camera orientation is first classified roughly for determining a zoom factor and then a horizontal alignment is carried out within the selected zoom range.

14. The method according to claim 13, characterized in that the zoom factor is only changed if the camera arrangement remains oriented for some seconds in a roughly classified range.

15. The method according to claim 11, characterized in that an image processing is selected for a video conference in which at least one of the following steps is carried out, i.e. that relatively large distances between conference participants are not transmitted in an image data stream or only with low resolution,
   and/or room areas clearly above the heads of the conference participants are trimmed,
   and/or images distorted in a fish-eye manner are rectified,
   and/or
   a back-light suppression is carried out.

* * * * *